United States Patent
Speer et al.

(10) Patent No.: US 9,201,864 B2
(45) Date of Patent: Dec. 1, 2015

(54) METHOD AND SYSTEM FOR CONVERTING DOCUMENT SETS TO TERM-ASSOCIATION VECTOR SPACES ON DEMAND

(71) Applicant: Luminoso Technologies, Inc., Cambridge, MA (US)

(72) Inventors: Robert Speer, Cambridge, MA (US); Lance Nathan, Arlington, MA (US); Jason Alonso, Cambridge, MA (US); Catherine Havasi, Cambridge, MA (US); Kenneth Arnold, Cambridge, MA (US)

(73) Assignee: Luminoso Technologies, Inc., Cambridge, MA (US)

( * ) Notice: Subject to any disclaimer, the term of this patent is extended or adjusted under 35 U.S.C. 154(b) by 305 days.

(21) Appl. No.: 13/840,255

(22) Filed: Mar. 15, 2013

(65) Prior Publication Data
US 2014/0278359 A1 Sep. 18, 2014

(51) Int. Cl.
*G06F 17/27* (2006.01)

(52) U.S. Cl.
CPC .................. *G06F 17/2785* (2013.01)

(58) Field of Classification Search
CPC .......... G06F 17/2785; G06F 17/30616; G06F 17/3071; G06F 17/218; G06F 17/30613; G06F 17/3069; Y10S 707/99933; Y10S 707/99935; Y10S 707/99936; Y10S 707/99937; Y10S 707/99945; G06K 9/6218
USPC ....... 704/9, 7, 4; 717/123; 708/200; 707/765, 707/756, 739, 737, 711, 695; 706/45, 15
See application file for complete search history.

(56) References Cited

U.S. PATENT DOCUMENTS

| | | | | |
|---|---|---|---|---|
| 6,484,168 B1* | 11/2002 | Pennock | ............. | G06F 17/3061 |
| 6,510,406 B1* | 1/2003 | Marchisio | ........... | G06F 17/2715 704/9 |
| 6,701,305 B1* | 3/2004 | Holt | ................. | G06F 17/30613 706/12 |
| 7,167,823 B2* | 1/2007 | Endo | ................. | G06F 17/30265 704/7 |
| 8,583,614 B1* | 11/2013 | Dilts | ................. | G06F 17/30575 707/695 |
| 2002/0022956 A1* | 2/2002 | Ukrainczyk | .......... | G06F 17/218 704/9 |
| 2003/0023570 A1* | 1/2003 | Kobayashi | ........ | G06F 17/30675 706/15 |
| 2005/0143971 A1* | 6/2005 | Burstein | ............... | G06F 17/274 704/4 |
| 2006/0184481 A1* | 8/2006 | Zhang | ............... | G06F 17/30616 706/45 |
| 2007/0118506 A1* | 5/2007 | Kao | ................... | G06F 17/30719 |
| 2007/0118518 A1* | 5/2007 | Wu | .................... | G06F 17/30719 |
| 2011/0004588 A1* | 1/2011 | Leitersdorf | ....... | G06F 17/30864 707/711 |
| 2013/0204885 A1* | 8/2013 | Clinchant | ............ | G06K 9/4676 707/756 |
| 2013/0268916 A1* | 10/2013 | Misra | ........................ | G06F 8/74 717/123 |
| 2014/0067846 A1* | 3/2014 | Edwards | ............. | G06F 17/3064 707/765 |
| 2014/0122550 A1* | 5/2014 | Zhang | ..................... | G06F 17/18 708/200 |
| 2014/0258301 A1* | 9/2014 | Misra | ................ | G06F 17/30731 707/739 |
| 2014/0280148 A1* | 9/2014 | Stankiewicz | ........ | G06F 17/3071 707/737 |

* cited by examiner

*Primary Examiner* — Michael Colucci
(74) *Attorney, Agent, or Firm* — Law Office of Ilya Libenzon

(57) ABSTRACT

Disclosed herein is a method and system for producing a term association vector space on demand for a client given a document set in electronic form. The method extracts terms from the document set, stripping out words that do not convey meaning and adding important phrases within the context of the document set to the terms. Associations between terms are calculated, subjected to further analytical processes, and collected in a matrix, whose rows are vectors defining the vector space. Additional associational data can be added by matrix arithmetic, and documents can be rendered as further vectors in the space.

12 Claims, 4 Drawing Sheets

METHOD AND SYSTEM FOR CONVERTING DOCUMENT SETS TO TERM-ASSOCIATION VECTOR SPACES ON DEMAND

TECHNICAL FIELD

Embodiments of the present invention relate generally to natural language processing computer methods and systems, and more particularly to the creation of vector spaces for analysis of natural language.

BACKGROUND ART

The use of vector spaces to represent documents and words, and to analyze the structure of languages by bringing the mathematics of statistics, combinatorics, and linear algebra to bear, has already proved to be a powerful tool in the field of natural language processing. Vector or matrix representations of word frequency within documents allow software programs to assess the likely meaning of documents in various ways without anybody ever having to read them. Mathematical transformations of such matrices, informed by statistical theory concerning language structure, can enable a textual search algorithm to seek out synonyms and related phrases for a search query, enabling a user to navigate the incredibly vast corpus of text available electronically on the internet and in collections of ebooks and other documents. Most users of the internet have benefitted from such algorithms, albeit unconsciously. Marketers have been able to find thousands of opinions concerning products, scattered among hundreds of millions of documents on various subjects, and compile them in intuitively clear ways, making reading any particular document almost unnecessary. Several different ways of representing documents as collections of vectors have developed since the inception of this discipline. In addition to term-document matrices, in which the rows represent terms (e.g. individual words) present in some document set, and the columns represent documents containing such words, there are matrices representing words and some form of word context in their rows and columns, respectively. Finally, there is a kind of matrix which symmetrically represents terms in both the rows and columns, and in which each cell contains a number representing a relationship, such as co-occurrence, between the cell's row-term and column-term. That last example will be referred to herein as a term-association matrix. These matrices, the vector sets they contain, and the vector spaces they represent, provide engineers with a wealth of textual information that may be used to analyze text.

Natural language processing is still a new and maturing field. That there remains much to be discovered is obvious to anyone who has been exposed to the stilted conversation of automated phone systems, as compared to the facile manipulation of language within the grasp of an ordinary human mind. Furthermore, there remains a dearth of products that can quickly analyze documents and produce useful mathematical representations in a timely manner.

SUMMARY OF THE EMBODIMENTS

It is therefore an object of the instant invention to provide a product that can rapidly produce a term-association vector space on demand, given a large set of documents in electronic form. It is a further object of the instant invention to bring a sophisticated platform for natural language processing quickly within reach of any person with a corpus of text to analyze.

One embodiment of this invention is a method performed by a system made up of at least one computer or similar electronic device, in which a set of documents is received by the system, which extracts terms from the document set, saves each term in the memory, then enumerates connections between terms. The terms and connection counts are saved in a matrix in which the terms represent both the rows and columns, and in which each cell contains a number representing the term connection count between the term represented by its row, and the term represented by its column. Finally, the rows of the matrix are saved as a collection of vectors, each of which represents one term and has components representing that term's relationship with all the other terms extracted from the document set.

In a related embodiment, the term extraction step includes a process for adding phrases to the list of terms. This is done by extracting all distinct words from the document set. A saved number represents the maximum phrase length in words to be analyzed. Each sequence of words ranging from two words to the maximum phrase length in the document set is also saved to the device memory. Then, for each said sequence, the system counts its total number of appearances in the document set, along with the total number of appearances in the document set of the sequence's component words. The devices then evaluate the sequence's statistical significance using a formula comparing the number of appearances of the sequence to the number of appearances of its component words. If the sequence's rate of appearance is statistically significant, it is saved in the memory with the other terms.

Another embodiment involves performing a truncated Singular Value Decomposition process on the matrix to reduce the dimensionality of the resulting vector space while improving the quality of the information the space contains. An additional embodiment involves performing a spectral association process on the matrix to strengthen multi-link associations between terms. Yet another embodiment involves combining the matrix with another matrix representing term association data extracted from another document set or produced to codify common-sense rules concerning term associations. Still another embodiment involves creating vectors representing each document from the document set by extracting and saving to memory the terms from each document, enumerating term connections, weighting for proximity as before, saving those term connection enumerations in a matrix in which the terms represent both the rows and columns, and in which each cell contains a number representing the term connection count between the term represented by its row, and the term represented by its column, and adding the rows of that matrix together to produce a document vector. A final method embodiment involves performing inverse document frequency scaling on each said row in the matrix prior to adding together the rows to produce said document vector.

Also disclosed is a system for generating a term-association vector space made up of a set of term vectors from a set of electronic documents. The system is made up of an electronic device, or two or more electronic devices connected by a network. The device or devices' processors are configured to create an application, which has a Processing Component and a Data Storage Component. The Processing Component is configured to extract the terms from the documents and to enumerate term connections. The Data Storage Component is configured to save extracted terms to memory in some form, to save the enumerations of term connections in a matrix in which the terms represent both the rows and columns, and in which each cell contains a number representing the number of term connections between the term represented by its row, and the term represented by its column, and to save the rows of that matrix as the term vectors.

In a related embodiment, the Data Storage Component is configured to maintain a number representing the maximum phrase length to be evaluated, to save words as terms, to save sequences discovered in the document set for the time it takes to traverse them and evaluate their significance, and to save statistically significant sequences in as additional terms. The Processing Component is configured to extract terms by extracting all distinct words from the document set and finding all sequences of words of lengths ranging from two to the maximum phrase length in the document set. For each sequence the Processing Component is configured to count its total number of appearances in the document set, to count the total number of appearances in the document set of the sequence's component words, and to evaluate the sequence's statistical significance using those numbers.

Another embodiment involves configuring the Processing Component to perform a truncated Singular Value Decomposition process on the matrix. An additional embodiment involves configuring the Processing Component to perform a spectral association process on the matrix. Yet another embodiment involves configuring the Processing Component to receive an additional background matrix and combine the matrix with the additional background matrix. According to still another embodiment, the Processing Component is further configured to create vectors representing each document from the document set by extracting terms from that document, enumerating term connections, weighting for proximity, and adding matrix rows together to produce a document vector. The Data Storage Component is configured to save each of the extracted terms, and to save enumerations of term connections in a matrix in which the terms represent both the rows and columns, and in which each cell contains a number representing the number of term connections between the term represented by its row, and the term represented by its column, as so enumerated, and to save the document vector in the device or devices' memory. According to a final embodiment, the Processing Component is further configured to perform inverse document frequency scaling on each row of the document matrix prior to adding together those rows to produce the document vector.

Other aspects, embodiments and features of the invention will become apparent from the following detailed description of the invention when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The preceding summary, as well as the following detailed description of the invention, will be better understood when read in conjunction with the attached drawings. For the purpose of illustrating the invention, presently preferred embodiments are shown in the drawings. It should be understood, however, that the invention is not limited to the precise arrangements and instrumentalities shown.

DETAILED DESCRIPTION OF SPECIFIC EMBODIMENTS

Figure 1:
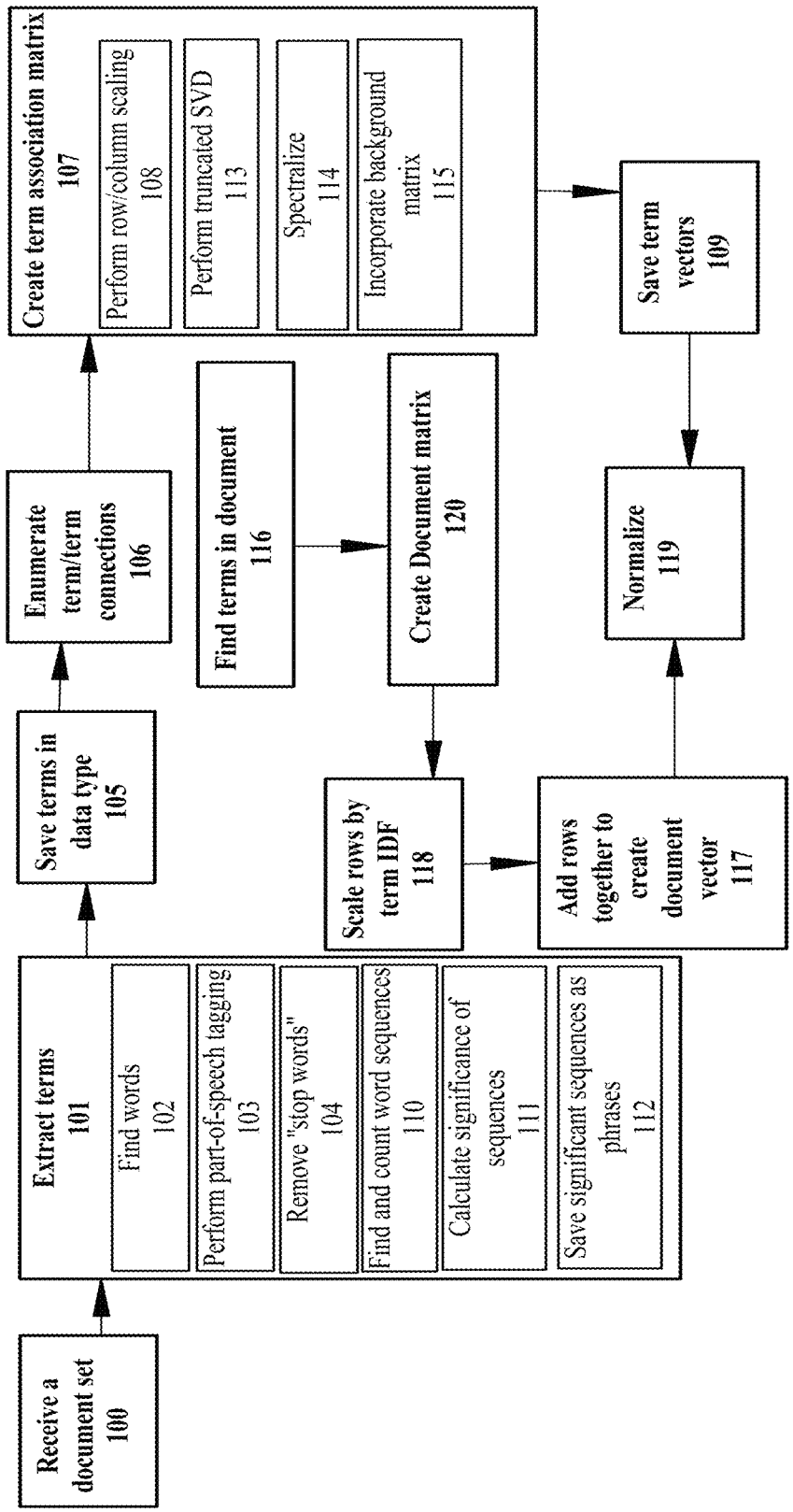
FIG. 1 is a flow chart illustrating various embodiments of the claimed method.

The instant invention is an application that receives text in electronic form from some source, and transforms the text into a vector space that reveals relationships between significant terms. The algorithm first parses the text for all of its words, stripping away words that do not contribute to meaning, and locating phrases that, according to statistical analysis, merit treatment as terms in their own right. The resulting vector space has one dimension per term, and each term within the vector space has a vector calculated by the process, which points in a direction within the vector space reflecting the strength of its relationship with each of the other terms. Each document contained in the text analyzed to create the vector space can also be transformed into a vector in its own right, which reveals the relationship between the document itself and the terms in the vector space. Other vector representations of the same language can be added into the vector space by matrix arithmetic, to render a set of term and document relationships reflective of broader patterns within the language of the text.

Definitions

As used in this description and the accompanying claims, the following terms shall have the meanings indicated, unless the context otherwise requires.

An "electronic device" is defined herein as including personal computers, laptops, tablets, smart phones, and any other electronic device capable of supporting an application as claimed herein.

A "term" is any string of symbols that may be represented as text on an electronic device as defined herein. In addition to single words made of letters in the conventional sense, the meaning of "term" as used herein includes without limitation a phrase made of such words, a sequence of nucleotides described by AGTC notation, any string of numerical digits, and any string of symbols whether their meanings are known or unknown to any person.

A "vector space" follows the mathematical definition of a vector space as a non-empty set of objects called "vectors," and is closed under the operations of vector addition and scalar multiplication. In practical terms, the vectors discussed herein will consist of lists of numbers, where each entry in the list is called a "component" of the vector. A vector with n components is described herein as an "n-dimensional vector." A vector space is "n-dimensional" if it is spanned by a set of n vectors. For the purposes of this application, it will be assumed that the large collections of vectors with n components contemplated by this invention will span an n-dimensional space, although it is theoretically possible that the space defined by a particular collection of n-dimensional vectors as defined herein will have fewer than n dimensions; the invention would still function equally well under such circumstances. A "subspace" of an n-dimensional vector space is a vector space spanned by fewer than n vectors contained within the vector space. In particular, a two dimensional subspace of a vector space may be defined by any two orthogonal vectors contained within the vector space.

A vector's "norm" is a scalar value indicating the vector's length or size, and is defined in the conventional sense for an n-dimensional vector a as:

$$\|a\| = \sqrt{\sum_{i=0}^{n} a_i^2}$$

A vector is "normalized" if it has been turned into a vector of length 1, or "unit vector" by scalar-multiplying the vector with the multiplicative inverse of its norm. In other words, a vector a is normalized by the formula $$\frac{a}{\|a\|}.$$

Figure 2:
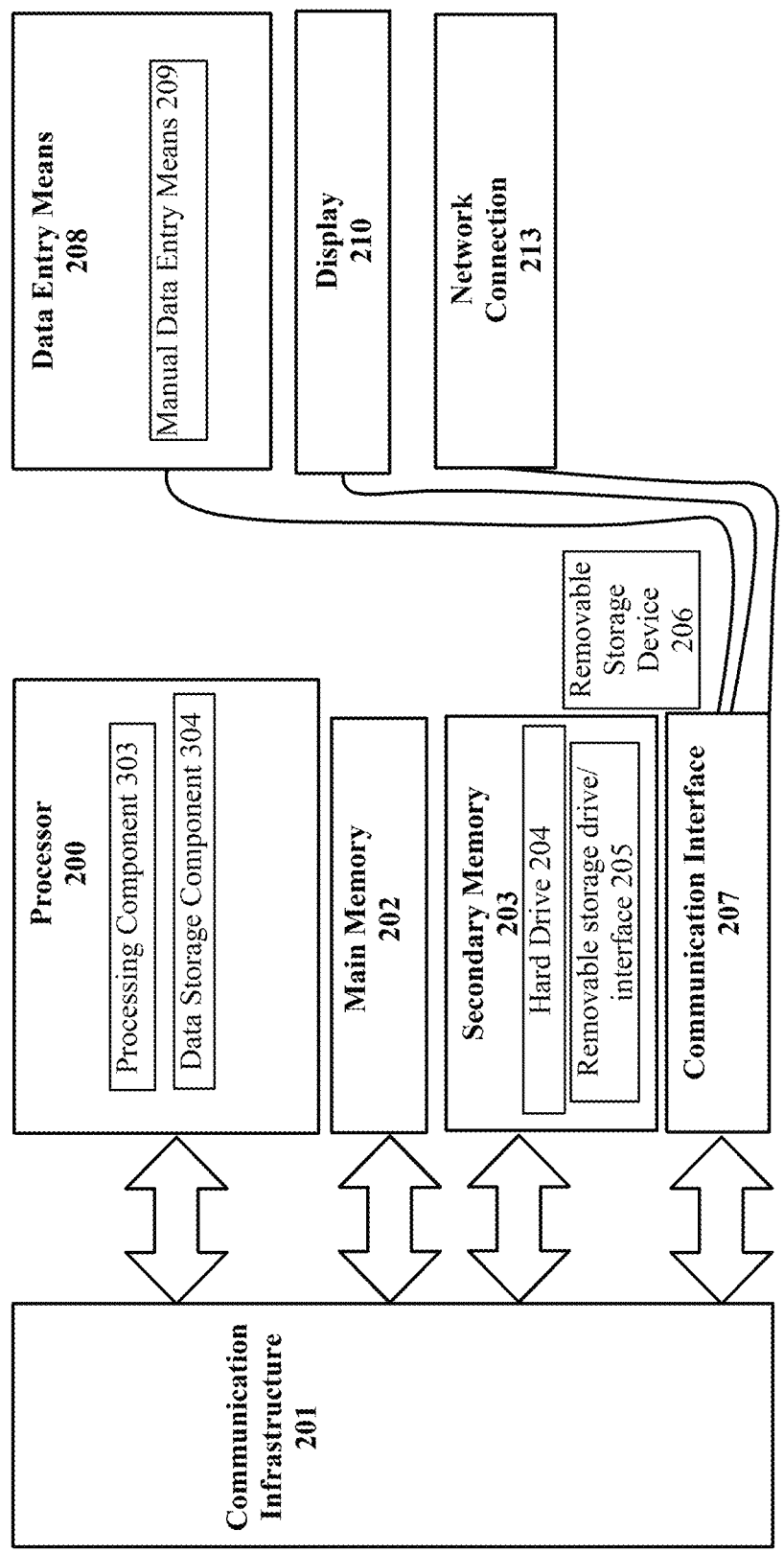
FIG. 2 is a schematic diagram illustrating a typical electronic device that might perform the claimed method, or comprise a portion of the claimed system.

The system and method disclosed herein will be better understood in light of the following observations concerning the electronic devices that support the disclosed application, and concerning the nature of web applications in general. An exemplary electronic device is illustrated by FIG. 2. The processor 200 may be a special purpose or a general purpose processor device. As will be appreciated by persons skilled in the relevant art, the processor device 200 may also be a single processor in a multi-core/multiprocessor system, such system operating alone, or in a cluster of computing devices operating in a cluster or server farm. The processor 200 is connected to a communication infrastructure 201, for example, a bus, message queue, network, or multi-core message-passing scheme.

The electronic device also includes a main memory 202, such as random access memory (RAM), and may also include a secondary memory 203. Secondary memory 203 may include, for example, a hard disk drive 204, a removable storage drive or interface 205, connected to a removable storage unit 206, or other similar means. As will be appreciated by persons skilled in the relevant art, a removable storage unit 206 includes a computer usable storage medium having stored therein computer software and/or data. Examples of additional means creating secondary memory 203 may include a program cartridge and cartridge interface (such as that found in video game devices), a removable memory chip (such as an EPROM, or PROM) and associated socket, and other removable storage units 206 and interfaces 205 which allow software and data to be transferred from the removable storage unit 206 to the computer system.

The electronic device may also include a communications interface 207. The communications interface 207 allows software and data to be transferred between the electronic device and external devices. The communications interface 207 may include a modem, a network interface (such as an Ethernet card), a communications port, a PCMCIA slot and card, or other means to couple the electronic device to external devices. Software and data transferred via the communications interface 207 may be in the form of signals, which may be electronic, electromagnetic, optical, or other signals capable of being received by the communications interface 207. These signals may be provided to the communications interface 207 via wire or cable, fiber optics, a phone line, a cellular phone link, and radio frequency link or other communications channels. The communications interface in the system embodiments discussed herein facilitates the coupling of the electronic device with data entry devices 208, which can include such manual entry means 209 as keyboards, touchscreens, mouses, and trackpads, the device's display 210, and network connections, whether wired or wireless 213. It should be noted that each of these means may be embedded in the device itself, attached via a port, or tethered using a wireless technology such as BLUETOOTH®.

Computer programs (also called computer control logic) are stored in main memory 202 and/or secondary memory 203. Computer programs may also be received via the communications interface 207. Such computer programs, when executed, enable the processor device 200 to implement the system embodiments discussed below. Accordingly, such computer programs represent controllers of the system. Where embodiments are implemented using software, the software may be stored in a computer program product and loaded into the electronic device using a removable storage drive or interface 205, a hard disk drive 204, or a communications interface 207.

Persons skilled in the relevant art will also be aware that while any device must necessarily comprise facilities to perform the functions of a processor 200, a communication infrastructure 201, at least a main memory 202, and usually a communications interface 207, not all devices will necessarily house these facilities separately. For instance, in some forms of electronic devices as defined above, processing 200 and memory 202 could be distributed through the same hardware device, as in a neural net, and thus the communications infrastructure 201 could be a property of the configuration of that particular hardware device. Many devices do practice a physical division of tasks as set forth above, however, and practitioners skilled in the art will understand the conceptual separation of tasks as applicable even where physical components are merged.

This invention could be deployed in a number of ways, including on a stand-alone electronic device, a set of electronic devices working together in a network, or a web application. Persons of ordinary skill in the art will recognize a web application as a particular kind of computer program system designed to function across a network, such as the Internet. A schematic illustration of a web application platform is provided in FIG. 3. Web application platforms typically include at least one client device 300, which is an electronic device as described above. The client device 300 connects via some form of network connection to a network 301, such as the Internet. Also connected to the network 301 is at least one server device 302, which is also an electronic device as described above. Of course, practitioners of ordinary skill in the relevant art will recognize that a web application can, and typically does, run on several server devices 302 and a vast and continuously changing population of client devices 300. Computer programs on both the client device 300 and the server device 302 configure both devices to perform the functions required of the web application 305. Web applications 305 can be designed so that the bulk of their processing tasks are accomplished by the server device 302, as configured to perform those tasks by its web application program, or alternatively by the client device 300. However, the web application must inherently involve some programming on each device.

Many electronic devices, as defined herein, come equipped with a specialized program, known as a web browser, which enables them to act as a client device 300 at least for the purposes of receiving and displaying data output by the server device 302 without any additional programming. Web browsers can also act as a platform to run so much of a web application as is being performed by the client device 300, and it is a common practice to write the portion of a web application calculated to run on the client device 300 to be operated entirely by a web browser. Such browser-executed programs are referred to herein as "client-side programs," and frequently are loaded onto the browser from the server 302 at the same time as the other content the server 302 sends to the browser. However, it is also possible to write programs that do not run on web browsers but still cause an electronic device to operate as a web application client 300. Thus, as a general matter, web applications require some computer program configuration of both the client device (or devices) 300 and the server device 302 (or devices). The computer program that comprises the web application component on either electronic device's system FIG. 2 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Finally, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

FIG. 1 illustrates the disclosed method, which may be performed by one electronic device as described above, or by a group of such devices connected to a network, such as the internet. A set of documents is provided 100 in digital form. The documents could be copied into the memory of the electronic device or devices via a disk or removable storage device, or over a network connection. The electronic device or devices proceed to extract terms from the documents in the set 101. This is probably best accomplished in a series of component steps. First, the document can be parsed for its individual words, for instance using a parsing algorithm that divides the words in a document into tokens 102. Persons skilled in the art will be aware that a number of such algorithms already exist. Next, the discovered words can be subjected to part-of-speech tagging to avoid counting two essentially identical words separately 103. One possible example of part-of-speech tagging 103 would be identifying singular and plural forms of a word as equivalent. Similarly, words that differ only by a prefix and suffix may be grouped together as a single word. More thorough categorization of words by relatedness may be used as well, particularly if the document set is in a language that is readily organized into larger structures of word relationships by string manipulations (e.g. Arabic). This also requires choosing a form for the word to represent the set of words being identified as the same for the purposes of the algorithm. If the electronic device or devices performing the method are connected to the internet, an additional step may be performed to convert a uniform resource locator (URL) into terms, by navigating to that URL in the internet and adding the title encountered at that URL, or some other specified data or metadata from the content at that URL, to the list of words that are in the document.

The next step in creating the term-association matrix is to collect the list of terms. One way to implement this is as follows: the tokens of each document are preserved in their order as a long sequence of "raw" terms. A preferred step at this point is the removal from that sequence 104 of what skilled practitioners in natural language processing call "stopwords," which is a collection of single terms that represent punctuation, function words (i.e. words that provide grammatical structure but not meaning to a sentence, such as "the" and "from"), and other words that do not confer meaning are removed from the list of terms. Implementation-specific decisions must also be made regarding the treatment of special cases. For instance words carry meaning, but only by reference to other words, and must thus be dealt with only by reference to adjacent words and phrases. Perhaps the most pervasive example is words whose effect is to negate linked words or phrases, such as the word "not." These negation words create two separate challenges: first, their presence in the document as independent words is essentially worthless. Second, they change the import of the linked word or phrase, and thus can subvert the statistical assumptions that form the basis of the vector representation. As an example, if the documents used to create the vector space were reviews of hotels, the sentence "I was not impressed with the service" should not be added to a count of the occurrences of the phrase "impressed with the service," and associated with positive review. That particular error could potentially make a document loaded with negative reviews look misleadingly positive. This effect may be negated, among other ways, by making sure that every phrase containing a negation, if used as a term at all, is used with its negation included (e.g. "not impressed"), and by making sure that negations in themselves enter the term list only as members of their associated words or phrases.

Finally, the term-association matrix can be built 107. To do this, the algorithm arranges the terms into a list or other data type that maintains them in a certain order 105. This list of terms makes up both the list of rows and of columns in a matrix, referred to herein for the purposes of formulas as A. Furthermore, the rows and the columns may be, and preferably are, arranged in the same order, so that the resulting matrix is symmetric. Each cell in the matrix contains a number associating the term in the row and the term in the column. This number may be obtained by a number of means, depending on the information concerning the term pairs that the implementation is intended to address. One approach to collecting the information is by enumerating the number of appearances of the two terms within a certain number of tokens of each other in the document 106, generally giving greater weight to appearances closer to each other. For instance, the number could increment by one when encountering the two terms in question five words apart, by two when they are four words apart, three when they are three words apart, four when they are two words apart, and five when they are one word apart. Appearances more than five words apart would not add anything to the count. The scale of increase could also be non-linear, assigning more or less importance to adjacency. By nature, if this matrix is built usefully, it must be sparse, because useful word associations must necessarily be far rarer than the total number of possible word pairs in a text. Each row or column of this matrix defines a vector corresponding to one of the terms. Preferably, A will be subjected to an additional process known as row-column scaling 108, in which the norms of the rows of A, considered as vectors, and the norms of the columns of A, also considered as vectors, are all made closer to each other in magnitude, while preserving those vectors' directional properties; where, as here, the direction in which a vector points in the vector space is the characteristic that imbues the interpretation of the vector space with meaning, a wide range of vector sizes makes calculation difficult while adding nothing to the usefulness of the vector representation. One method for row-column scaling 108 in the instant invention involves creating a vector called 'norms', which will contain the magnitude of each row of matrix A, considered as a vector. The entry norms is the norm, as defined herein, of the vector found in $A_i$. Because A is symmetric, norms also contains the norm of each column.

Each non-zero entry in A is scaled by the geometric mean of its row norm and its column norm. Thus, $A_{ij}$ will be replaced with $$\frac{A_{ij}}{\sqrt{norms_i \times norms_j}}.$$

Figure 4:
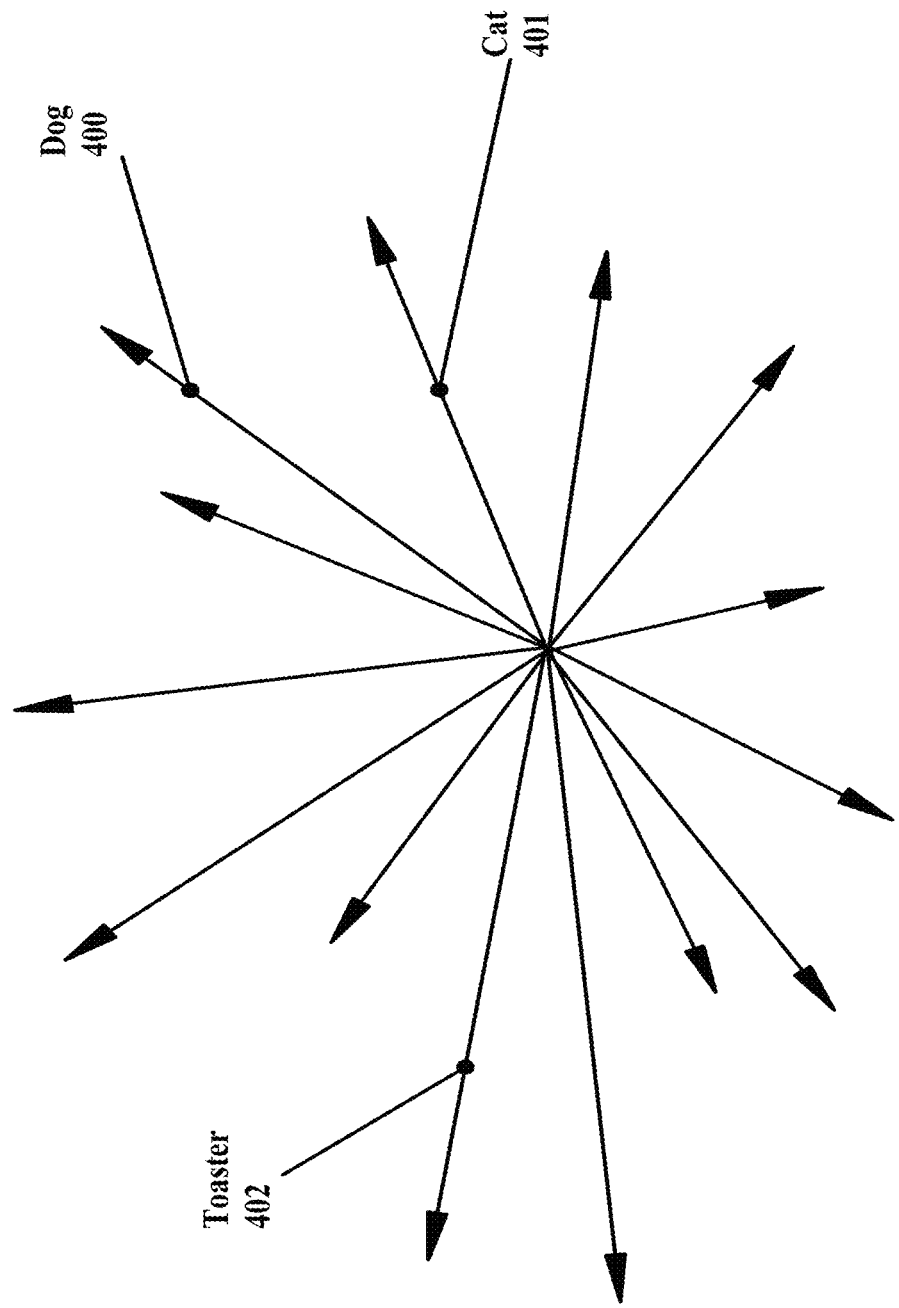
FIG. 4 is a diagram illustrating a simple two-dimensional example of a vector space.

Once the matrix is completed, the rows of the matrix are saved in the electronic device or devices' memory as vectors within the vector space 109. Persons skilled in the art will be aware of the various data types useful for saving vectors, and collections of vectors, so that the typical mathematical manipulations of vectors can readily be performed on them. Where there are N terms, this will result in N vectors, and approximately an N-dimensional vector space. However, some of the transformations described below that may be performed on this matrix could result in a more compact vector space. FIG. 4 illustrates a simplified, two-dimensional picture of a term-vector space that the disclosed method might produce. The vectors corresponding to the word "dog" 400 and the word "cat" 401 are fairly close together, reflecting the relatively high likelihood that dogs and cats would appear together in a written text: each is a mammal, and a pet, and dogs and cats are often portrayed together in popular culture and mentioned in idiomatic expressions (e.g. "it's raining cats and dogs."). The vector corresponding to the word "toaster," 402 on the other hand, is pointing in nearly the opposite direction from the vectors for "dog" 400 and "cat" 401. This reflects that, at least in the text underlying this vector space, toasters are not often the subject of a sentence, paragraph, or document discussing dogs and cats. The words are not closely associated, and thus the vectors are far apart.

Figure 3:
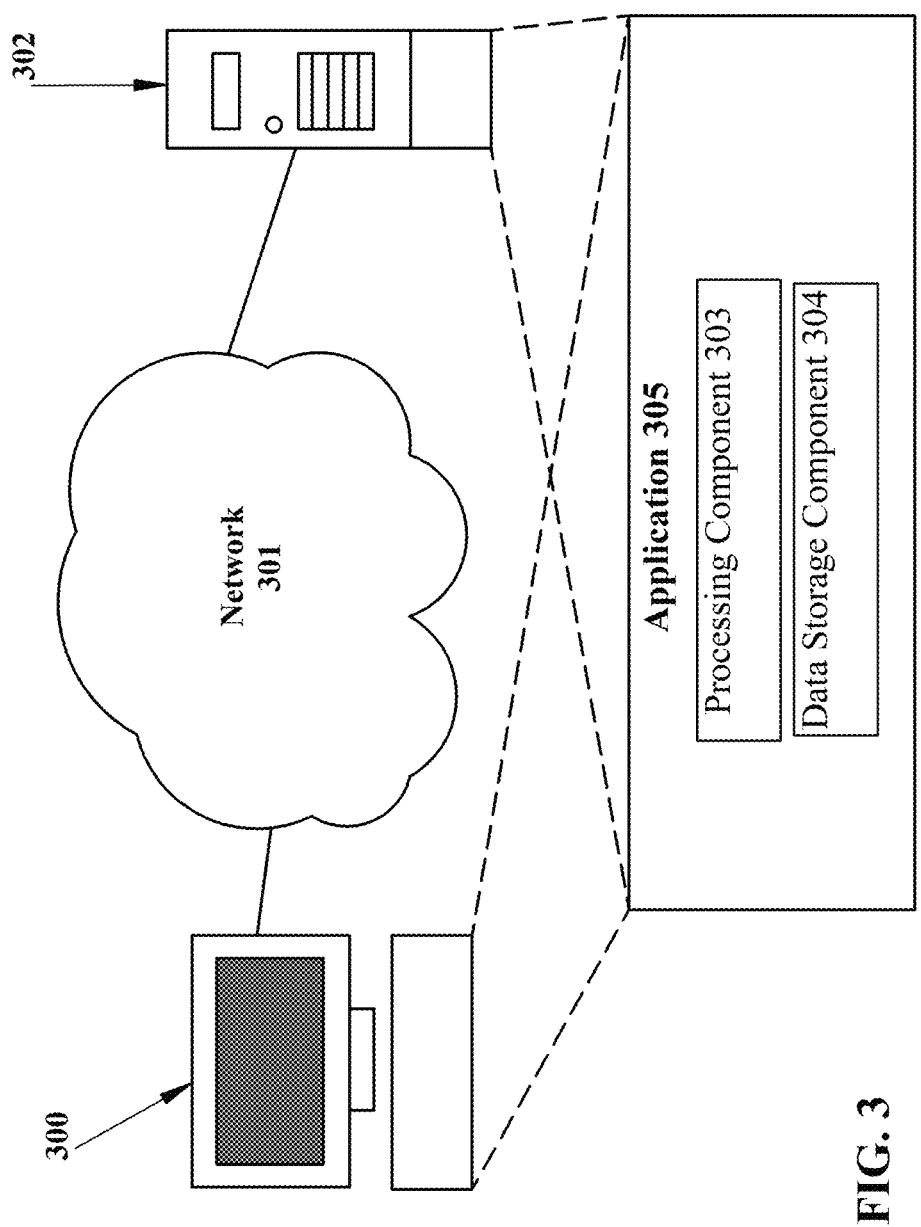
FIG. 3 is a schematic diagram of the claimed system.

A system FIG. 3 is also disclosed for producing the vector space. The system includes at least one electronic device 302 as defined above. If a single device 302 is used, the system can operate according to a stand-alone computer application or app deployment. Alternatively, one or more additional electronic devices 300 may be connected to the first device 302 via a network 301 such as the internet. In either case, the processor or processors of the devices 300, 302 are configured to run an application 305 including at least a Processing Component 303 and a Data Storage Component 304. If the system is deployed as a web application, additional components may be involved in communicating over the network with client machines 300, which could serve as sources of information or as recipients of the vector space the algorithm produces. The Processing Component 303 is configured to extract the terms from said documents, as described above, by tokenizing or otherwise parsing the document set into component words, stripping out "stopwords," and creating a term list. The Processing Component 303 is also configured to enumerate term connections, weighting for proximity as set forth in more detail above. The Data Storage Component 304 configured to save each of the terms generated by the Processing Component 303 into the devices' memory. Persons of ordinary skill in the art will recognize that a number of different data types exist that allow for the storage of lists of data such as the terms; the choice of a particular data type will depend on the approach the algorithm takes with regard to looking up terms in the data type or traversing the data type during an iterative process. The Data Storage Component 304 will also be configured to save term connection counts performed by the Processing Component 303 in a matrix in which the terms represent both the rows and columns, and in which each cell contains a number representing the term connection count between the term represented by its row, and the term represented by its column, and finally to save the rows of that matrix as term vectors. As before, the Processing Component 303 should ideally perform scaling to make the vector space more manageable without sacrificing the term-association meanings the vectors represent by their relative orientations within the term-association vector space. It is worth noting that the Processing Component 303 and Data Storage Component 304 need not be separate entities or modules within a particular program as implemented. The purpose of their status as elements in the system described herein is to establish that the processor or processors of any electronic devices 300, 302 comprising the system must be configured to perform their functions as set forth, but not to dictate the architecture of a particular implementation.

As noted in the definitions above, the document set's terms can include not only words, but also phrases. One way of extracting meaningful phrases from the document set is as follows: in the interests of efficiency, implementations can limit the length of a phrase to a specified number of words, or tokens, to some natural number h. For each number m from 1 to h, each distinct sequence of m tokens is discovered and counted 110. As an example, when m is 2, one two-token phrase might be "black dog," and each time the two-word phrase "black dog" was encountered in the document set, the number 1 would be added to the count for the two-word sequence "black dog." If, as discussed above, part-of speech tagging has been used to mark plurals and singulars as the same word, then every time the phrase "black dogs" was encountered, the count for the two-word sequence "black dog" would increase by one. A variation of this initial count of sequences involves weighting the count to reflect circumstances in the text that indicate some greater degree of importance for the sequence. For instance, if all words in the sequence are capitalized, as in "Black Dog," the count of instances of that sequence could be incremented by two rather than one. Then, for each multi-token sequence, a formula is evaluated 111, using such numbers as the occurrence-count as calculated above, the number of occurrences, of each token in the sequence, and total number of tokens in the document set, to determine whether the sequence can validly be counted as a distinct phrase. One formula that can aid in measuring the significance of two terms being found together in at a given distance is the log likelihood ratio, which practitioners skilled in natural language processing will recognize as a measure comparing the probability of finding two terms collocated with the probability of find them separately, with a higher number implying that the appearance of one term is somewhat dependent on the appearance of a collocation. If the number calculated using the formula surpasses a predetermined threshold amount, that sequence will be accepted by the method as a phrase, and added to a data type recording the list of phrases 112. If as before, the tokens of each document are preserved in their order as a long sequence of "raw" terms, where any sub-sequence within this grand sequence matches an entry in the phrase list, the terms in the sequence are joined into a single term representing that phrase. The remaining steps in matrix creation are the same, except that phrases are now among the terms that make up the rows and columns of the matrix.

The disclosed system FIG. 3 also can incorporate phrases as terms, by configuring the Processing Component 303 to find all sequences of words of lengths ranging from two to a maximum phrase length, as described above. The Processing Component 303 should also be configured to enumerate the appearances of each such sequence in the document set, possibly weighting the enumeration for appearances indicating greater significance, such as capitalized phrases. The number of appearances of each component word in the sequence are also enumerated by the Processing Component 303. Finally, the Processing Component 303 performs a formula such as the log likelihood ratio formula, to determine whether a given sequence's frequency of appearance is statistically significant as compared to the frequency of appearance of its component terms, and if formula result indicates that it is, accepting the sequence as a phrase. The Data Storage Component 304 in turn is configured to maintain the maximum phrase length in memory, and to save sequences discovered in the document so that they can be processed by the Processing Component 303 to assess their significance as phrases, and to save sequences accepted as phrases by the Processing Component 303 in the same data structure in which it saves other terms.

A useful variation in the production of the term-association matrix is to subject it to a process that reduces its dimensionality, and hence the dimensionality of the represented vector space, while enhancing the ability of the resultant vectors to detect synonymous terms and disassociate differing meanings of polysemous terms. A very useful example of such a method is the performance of a truncated Singular Value Decomposition (SVD) on A 113. SVD 113 involves factoring A as follows: $A=U\Sigma U^T$, where U is a matrix whose columns are the orthogonal eigenvectors of A, and where $\Sigma$ is a matrix defined in terms of the eigenvalues of A, ordered in descending size and denoted as $\lambda_1 \ldots \lambda_i \ldots \lambda_r$, where there are a total of r such eigenvalues. The entries of $\Sigma$ are all zero, except the first r diagonal entries from the upper left corner of the matrix, which are set to the eigenvalues like so: $\Sigma_{ii}=\sqrt{\lambda_i}\forall i:1\leq i\leq r$. Since all vectors on which a matrix can operate may be expressed as a linear expression of the matrix's eigenvectors, and since large eigenvalues affect eigenvectors much more strongly than small eigenvalues, if the lower-right diagonal entries of $\Sigma$ are set to zero, producing $\Sigma_k$, the resulting "cropped" matrix $A_k=U\Sigma_k U^T$ will have a very similar effect to that of the original A with regard to transformation of vectors. Thus, producing $\Sigma_k$ creates a new $A_k$ that captures a great deal of the information originally in A in far fewer dimensions. It is typical to crop all but the 150 largest diagonal values in E. This produces an $A_k$ that is much denser than A; as intuition might predict, this produces a much higher information density. As before, the rows of $A_k$ furnish the vectors of the vector space that the method produces. Scaling the future vectors is also advantageous, as before, and may be accomplished by normalizing 119 each row of $A_k$, using the process of vector normalization as described herein. The norms for some rows might be very small numbers, close enough to zero to create instability when dividing by them in a typical electronic device. In that case a small number on the order of $10^{-4}$ should be added to each norm to create more accurate results. The corresponding system embodiment FIG. 3 involves configuring the Processing Component 303 to perform the same truncated Singular Value Decomposition process on the term-association matrix.

A further procedure that may be performed on the term-association matrix after truncated SVD factoring is what is known as "spectralization" 114. The purpose of spectralization 114 is to strengthen connections between terms that would be found by going through multiple association links, while still emphasizing the importance of more direct links. Spectralization 114 is accomplished in three steps, which can be performed either after the original SVD factorization 113 described above, or after the truncation of $\Sigma$ to produce $\Sigma_k$. The process is the same regardless, except for a later truncation step that may be performed in the former case. For the sake of clarity, $\Sigma$ will be used here to signify either the original $\Sigma$ or its truncated counterpart $\Sigma_k$. The first step in the process is to divide every non-zero element of $\Sigma$ (i.e. its diagonal entries) by the largest value in $\Sigma$, $\Sigma_0$, which is denoted $\Sigma_0$. Next, each non-zero element of $\Sigma$, $\Sigma_{ii}$, is replaced with $e^{\Sigma/\Sigma_{ii}}$. If the process has been performed up to this point on the non-truncated $\Sigma$, then the newly transformed $\Sigma$, denoted $e^{\Sigma/\Sigma_0}$, may be truncated, as before, by replacing all but the k largest (and thus most significant) elements with zeros. Whether or not truncation was performed now or before, the final step is to calculate $U_{\_spec}=Ue^{\Sigma/\Sigma_0}$. The rows of $U_{\_spec}$ will furnish the vectors in the vector space produced by the method. As before, $U_{\_spec}$ should preferably be scaled, by normalizing each row according to the definition of vector normalization provided herein. Also as before, where any of the norms calculated for the rows are close to zero, a small number on the order of $10^{-4}$ should be added to each norm to prevent the instability that can result from dividing by numbers close to zero on an electronic device. The corresponding system embodiment FIG. 3 involves configuring the Processing Component 303 to perform the same spectralization process on the term-association matrix.

An additional possible step in the method is to augment the vector space with additional term-association data gathered from other sources 115. Each term-association matrix from the other source should be in a similar form to those produced by the above-disclosed method steps, with the same number of rows and columns. The sources from which such matrices are gathered could be another document set. Alternatively, the additional term-association matrices could reflect some more intentionally crafted "common sense" rules concerning term associations in the language of the document set, improving the match of the vector space to the reality of language use. If the truncated SVD 113 and spectralization 114 steps have not been performed on A, then such a matrix of terms associations, referred to herein as B, which must match the form of A, could simply be added to A. First, the term lists of A and B must be compared: if they differ, then for each term in B not found in A, one row and column of zeros should be added to A (preferably in a way that keeps A symmetric and leaves the terms in its rows and columns in the same order as B's). The same should be performed on B for terms in A that are missing from B. The result will be that both matrices have the same number of, rows, and columns, corresponding to the same set of terms in the same order. The rows and columns of B or A can be switched as necessary to place them in the correct order. Subsequently, the matrix A+B could be subjected to any or all of the processes described above. If, however, both matrices are products of a truncated SVD process 113, a different method is required to combine them in a way that approximates the addition of A and B prior to the SVD truncation process 113.

One approach to this algorithm requires several matrix operations. First, the term lists of A and B must be compared: if they differ, then for each term in B not found in A, one row and column of zeros should be added to A (preferably in a way that keeps A symmetric and leaves the terms in its rows and columns in the same order as B's). The same should be performed on B for terms in A that are missing from B. The result will be that both matrices have the same number of, rows, and columns, corresponding to the same set of terms in the same order. The rows and columns of B or A can be switched as necessary to place them in the correct order. Recall that the SVD of A produced matrices U and $\Sigma$ such that $A=U\Sigma U^T$, where $\Sigma$ is a matrix of singular values, originally diagonal, but in which the values to the right of a certain point have been changed to zero. The first calculation requires finding a matrix M, with the following property: $M=U^T B$. The next step is to use M in turn to find $P_p$, a matrix that fulfills the following equation: $P_p=B-UM$. Via the process of QR decomposition, two matrices P and $R_a$ are found with the properties that P is an orthonormal matrix, $R_a$ is an upper-diagonal matrix, and $P_p=PR_a$. The next step is to assemble a block matrix K. A "block matrix" as used herein is a matrix created out of other matrices by concatenating them row-wise or column-wise. For example if $$W = \begin{bmatrix} 1 & 2 \\ 3 & 4 \end{bmatrix},$$

$$X = \begin{bmatrix} 1 & 3 \\ 5 & 7 \end{bmatrix},$$

$$Y = \begin{bmatrix} 2 & 4 \\ 6 & 8 \end{bmatrix},$$

and $$Z = \begin{bmatrix} 3 & 6 \\ 9 & 12 \end{bmatrix},$$

then we can define a block matrix L as follows:

$$L = \begin{bmatrix} W & X \\ Y & Z \end{bmatrix} = \begin{bmatrix} 1 & 2 & 1 & 3 \\ 3 & 4 & 5 & 7 \\ 2 & 4 & 3 & 6 \\ 6 & 8 & 9 & 12 \end{bmatrix}.$$

In this case, the block matrix K is assembled from the four matrices $MM^T+\Sigma$ (i.e. $MM^T$ with the singular values of A as truncated added to its diagonal entries), $MR_a^T$, $R_aM^T$, and $R_aR_a^T$ as follows:

$$K = \begin{bmatrix} MM^T & MR_a^T \\ R_aM^T & R_aR_a^T \end{bmatrix}.$$

Next, an SVD is performed on K, producing matrices $U_K$ and $\Sigma_K$ such that $K=U_K\Sigma_K U_K^T$. $\Sigma_K$ may then be truncated to some number of significant values deemed appropriate for the implementation, as discussed above. Lastly, the matrix $U_p$, which is the product of $U_K$ with a block matrix concatenating U and P by columns: $U_p=[U\ P]U_K$ is created. The matrix that combines A with B in a new SVD is thus $U_P\Sigma_K U_P^T$, with $\Sigma_K$ providing the new singular values. The corresponding system embodiment FIG. 3 involves configuring the Processing Component 303 to receive an additional background matrix and combine said matrix with said additional background matrix.

Documents can also be represented as vectors in the term association vector space 117. This can be done with the documents originally used to create the vector space, or with additional documents, that can be added to the space as vectors. In either case, one approach to creating document vectors is to build a matrix for each document in which the rows and columns are the terms used to create the vector space 120. Each document's term-association matrix may be stored as a separate variable. The terms used to build the original vector space are located in the document 116, and term connections between terms within document are enumerated as before. All term connection enumerations are saved in the matrix, in which the terms represent both the rows and columns, and in which each cell contains a number representing the number of connections between the term represented by its row and the term represented by its column. A document's vector may then be produced by adding together all of the rows of that document's term-association matrix 117, by the process of vector addition, producing a single vector. This enables each document to be mapped within the same space as the vectors representing terms; the vector for a document would indicate the degree of that document's relationship with the terms contained in the overall vector space. As before, the document vectors should preferably be normalized 119, as defined herein, so that they fit in a comparable scale to all of the term vectors. The system FIG. 3 may also be deployed to produce document vectors. To do so, the Processing Component 303 is further configured to create vectors representing each document by finding the vector space terms and enumerating term connections as described above. The Processing Component 303 is further configured to and add the matrix rows together by vector addition to produce a document vector. The Data Storage Component 304 is configured to save each of the terms extracted by the Processing Component 303 to memory, to save a matrix of term connection counts as before, and to save the document vector assembled by the Processing Component 303 to the electronic device or devices' memory.

The document-vector production process may be further improved by scaling the terms in each document's matrix 118 prior to adding the matrix's terms together to produce the document vector. A given term's importance to a document should ideally be calculated by reference to that term's relative importance in the other documents within the document set. If a particular term is found very frequently throughout all of the documents within the broad set of documents used to create the vector space plus the set of all documents added later as vectors, its frequency in the instant document will not usefully distinguish the document from the other documents. As an example, if the set of documents is entirely made up of patent applications, the frequent appearance of the term "invention" within any one document should not be accorded significance, as all documents in the set will necessarily concern inventions. However, if the instant document is the only patent application in the document set, the greater frequency of the term "invention" in the document provides a useful way to distinguish it from the remainder of the set. A way to achieve this document-set specific scaling 118 of term importance is to multiply each term's row vector in the document's term-association matrix by the term's inverse document frequency (idf), which is generally calculated using the formula $$\text{Log}\left(\frac{|D|}{\{d \in D: t \in d\}}\right),$$

where D is the document set, |D| is the number of documents in D, and $\{d \in D: t \in d\}$ is the number of documents in D in which the term t appears. The term's numbers in the matrix can be further scaled to reflect the term's frequency over a large number of more generally selected documents. For instance, the term can be scaled by reference to its frequency in GOOGLE® books, using either an algorithm that counts the term frequency in the GOOGLE® books corpus itself, or by referencing the term-frequency numbers GOOGLE® itself offers in its ngrams dataset. If that frequency is called "gfrequency", then each term could be divided by $\sqrt{\text{gfrequency}}$. The overall scaling would thus be achieved by multiply each term's vector by $$\text{Log}\left(\frac{|D|}{\{d \in D: t \in d\}}\right) \times \frac{1}{\sqrt{\text{gfrequency}}}.$$

For a multiple-word phrase, it may be desirable to estimate the phrase's frequency instead of looking it up in a very large list of GOOGLE® ngrams. If the phrase can be broken into shorter phrases with raw frequencies a and b, one can overestimate the phrase's frequency as $$\frac{a \times b}{a+b}.$$

This operation is chosen because it scales with a and b and follows the associative law, so it can be repeated until the phrase is broken down into single words, and therefore only the frequencies of single words need to be readily available in the computer's memory. The resulting estimate will usually be higher than the actual frequency, but overestimating the frequency tends to lead to better results than underestimating it. The corresponding system embodiment FIG. 3 involves configuring the Processing Component 303 to perform the same inverse document frequency scaling on each row in the document's term-association matrix prior to adding together those rows to produce the document vector.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A method performed by at least one electronic device having a processor and a memory for generating a term-association vector space comprising a set of term vectors and at least one document vector, said method comprising:
   receiving a plurality of documents in electronic form;
   extracting terms from said plurality of documents;
   saving each of said terms in said memory;
   forming a first set of enumerations by enumerating term connections between each pair of said terms in said plurality of documents;
   saving said first set of enumerations in a first matrix in which the terms represent both the rows and columns, and in which each cell contains a number representing the enumeration, from the first set of enumerations, of connections within the plurality of documents between the term represented by its row, and the term represented by its column;
   saving the rows of said first matrix as a collection of term vectors defining a vector space;
   forming a second set of enumerations by enumerating, for each pair of said terms in said plurality of documents, the term connections between said each pair of terms within a single document of the plurality of documents;
   saving said second set of enumerations in a second matrix having the same number of rows and columns as the first matrix, and in which each cell contains a number representing the enumeration, from the second set of enumerations of connections within the single document between the term represented by its row, and the term represented by its column; and
   adding the rows of said second matrix together to produce a document vector representing the single document within said vector space.

2. The method of claim 1 in which the step of term extraction comprises:
   extracting all distinct words from said document set;
   maintaining in said memory a number representing the maximum phrase length;
   saving each sequence discovered in said document set of words, with lengths ranging from two words to said maximum phrase length, in said memory;
   for each said sequence, counting its total number of appearances in said document set;
   evaluating said sequence's statistical significance using said count of sequence appearances; and
   saving said statistically significant sequences in said memory as additional terms.

3. A method according to claim 1 further comprising performing a truncated Singular Value Decomposition process on said first matrix.

4. A method according to claim 3 further comprising performing a spectral association process on said first matrix.

5. A method according to claim 1, further comprising:
   receiving an additional background matrix; and
   combining said first matrix with said additional background matrix.

6. A method according to claim 1, further comprising performing inverse document frequency scaling on each row of said first matrix prior to adding together said rows to produce said document vector.

7. A system for generating a term-association vector space comprising a set of term vectors from a plurality of electronic documents, the system comprising one electronic device, or a set of two or more electronic devices linked by a network, each electronic device having a memory, and a processor, said processors together or singly operable to execute instructions to perform functions comprising:
   a Processing Component, configured to
      extract terms from said documents;
      form a first set of enumerations by enumerating term connections between each pair of said terms in said plurality of documents; and
      form a second set of enumerations by enumerating, for each pair of said terms in said plurality of documents, the term connections between said each pair of terms within a single document of the plurality of documents; and
   a Data Storage Component, configured to
      save each of said terms in said memory;
      save said first set of enumerations in a first matrix in which the terms represent both the rows and columns, and in which each cell contains a number representing the enumeration, from the first set of enumerations, between the term represented by its row, and the term represented by its column;
      save the rows of said matrix as said term vectors;
      save said second set of enumerations in a second matrix having the same number of rows and columns as the first matrix, and in which each cell contains a number representing the enumeration, from the second set of enumerations, of connections within the single document between the term represented by its row, and the term represented by its column; and add the rows of said second matrix together to produce a document vector representing the single document within said vector space.

8. A system according to claim 7, wherein said Data Storage Component is configured to maintain in said memory a number representing a maximum phrase length, to save words extracted from said document set as terms, to save sequences discovered in said document set in said memory, and to save statistically significant sequences in said memory as additional terms, and wherein said Processing Component is configured to extract terms by:

extracting all distinct words from said document set;
finding all sequences of words of lengths ranging from two to said maximum phrase length in said document set;
for each said sequence, counting its total number of appearances in said document set; and
evaluating said sequence's statistical significance using said count of sequence appearances.

9. A system according to claim 7, wherein said Processing Component is further configured to perform a truncated Singular Value Decomposition process on said first matrix.

10. A system according to claim 9, wherein said Processing Component is further configured to perform a spectral association process on said first matrix.

11. A system according to claim 7, wherein said Processing Component is further configured to receive an additional background matrix and combine said first matrix with said additional background matrix.

12. A system according to claim 7, wherein said Processing Component is further configured to perform inverse document frequency scaling on each said row of said second matrix prior to adding together the rows of said second matrix to produce said document vector.

* * * * *